United States Patent
Scheible et al.

(10) Patent No.: US 6,230,736 B1
(45) Date of Patent: May 15, 2001

(54) VALVE, PARTICULARLY DOUBLE-SEAT VALVE

(75) Inventors: Werner Scheible; Tai Luong Du, both of Aalen (DE)

(73) Assignee: Gebr. Rieger GmbH & Co. KG, Aalen (GB)

(*) Notice: Subject to any disclaimer, the term of this patent is extended or adjusted under 35 U.S.C. 154(b) by 0 days.

(21) Appl. No.: 09/396,613

(22) Filed: Sep. 15, 1999

(30) Foreign Application Priority Data

Sep. 18, 1998 (DE) .............................................. 198 42 922

(51) Int. Cl.$^7$ .......................... B08B 9/027; B08B 9/032; F16K 11/00; F16K 31/124
(52) U.S. Cl. .................... 137/312; 137/240; 137/614.18; 251/63.5; 251/63.6; 251/900
(58) Field of Search ...................................... 137/240, 312, 137/614.17, 614.18, 614.19; 251/63.6, 900, 63.5; 73/40.5 R, 46; 134/94.1, 98.1, 99.1, 166 C, 171

(56) References Cited

U.S. PATENT DOCUMENTS

| | | | |
|---|---|---|---|
| 2,243,344 | * | 5/1941 | Karst ..................... 137/312 |
| 2,666,614 | | 1/1954 | Grove et al. .......... 251/900 |
| 2,713,989 | | 7/1955 | Bryant .................. 251/900 |
| 2,778,598 | | 1/1957 | Bolling, Jr. ............ 251/63 |
| 4,096,884 | * | 6/1978 | Horowitz .............. 137/627.5 |
| 4,304,251 | * | 12/1981 | Schadel et al. ....... 137/312 |
| 4,373,545 | | 2/1983 | Knappe ................ 137/240 |
| 4,655,253 | * | 4/1987 | Ourensma ........... 137/614.18 |
| 4,757,834 | * | 7/1988 | Mieth ................... 137/312 |
| 4,995,416 | * | 2/1991 | Mieth ................... 137/1 |
| 5,048,555 | * | 9/1991 | Mieth et al. .......... 137/238 |
| 5,085,241 | * | 2/1992 | Mieth ................... 137/1 |
| 5,904,173 | * | 5/1999 | Ozawa ................. 137/240 |
| 6,009,896 | * | 1/2000 | Van Oosten ......... 137/240 |
| 6,014,983 | * | 1/2000 | Sondergaard et al. ............ 137/312 |

FOREIGN PATENT DOCUMENTS

| | | |
|---|---|---|
| 12 47 788 | 2/1966 | (DE) . |
| 2 321 812 | 11/1974 | (DE) . |
| 25 05 544 | 2/1975 | (DE) . |
| 85 24 858 U1 | 8/1985 | (DE) . |
| 38 35 944 A1 | 10/1988 | (DE) . |
| 196 52 215 A1 | 12/1996 | (DE) . |
| 0 044 517 A1 | 7/1981 | (EP) . |
| 0 545 846 A1 | 11/1992 | (EP) . |
| 0 711 940 A1 | 2/1995 | (EP) . |
| 0 819 876 A2 | 1/1998 | (EP) . |
| 0 834 689 A1 | 4/1998 | (EP) . |

OTHER PUBLICATIONS

German Search Report dated Mar. 31, 1999.

* cited by examiner

Primary Examiner—George L. Walton
(74) Attorney, Agent, or Firm—Quarles & Brady LLP

(57) ABSTRACT

A double-seat valve more particularly usable for the control of fluids to be kept separate in the chemical and foods sector is described, which has a valve housing (2) forming a first and a second housing spaces. There are two series-positioned valve bodies (10, 11) movable relative to one another and axially with respect to the valve housing, which define between them a leakage cavity (12) open to the environment of the valve. Each of the valve bodies has at least one sealing groove (15, 16) open to a housing-fixed valve seat or face (5) and in which is placed a seal (13, 14). According to the invention, the sealing grooves (15, 16) are connected in fluid-conducting manner through the associated valve bodies (10, 11) to the leakage cavity (12). The valve satisfies the highest possible hygienic demands, has little or no tendency towards contaminant deposition in the sealing area and can be rapidly and effectively cleaned.

30 Claims, 4 Drawing Sheets

Figure 2:
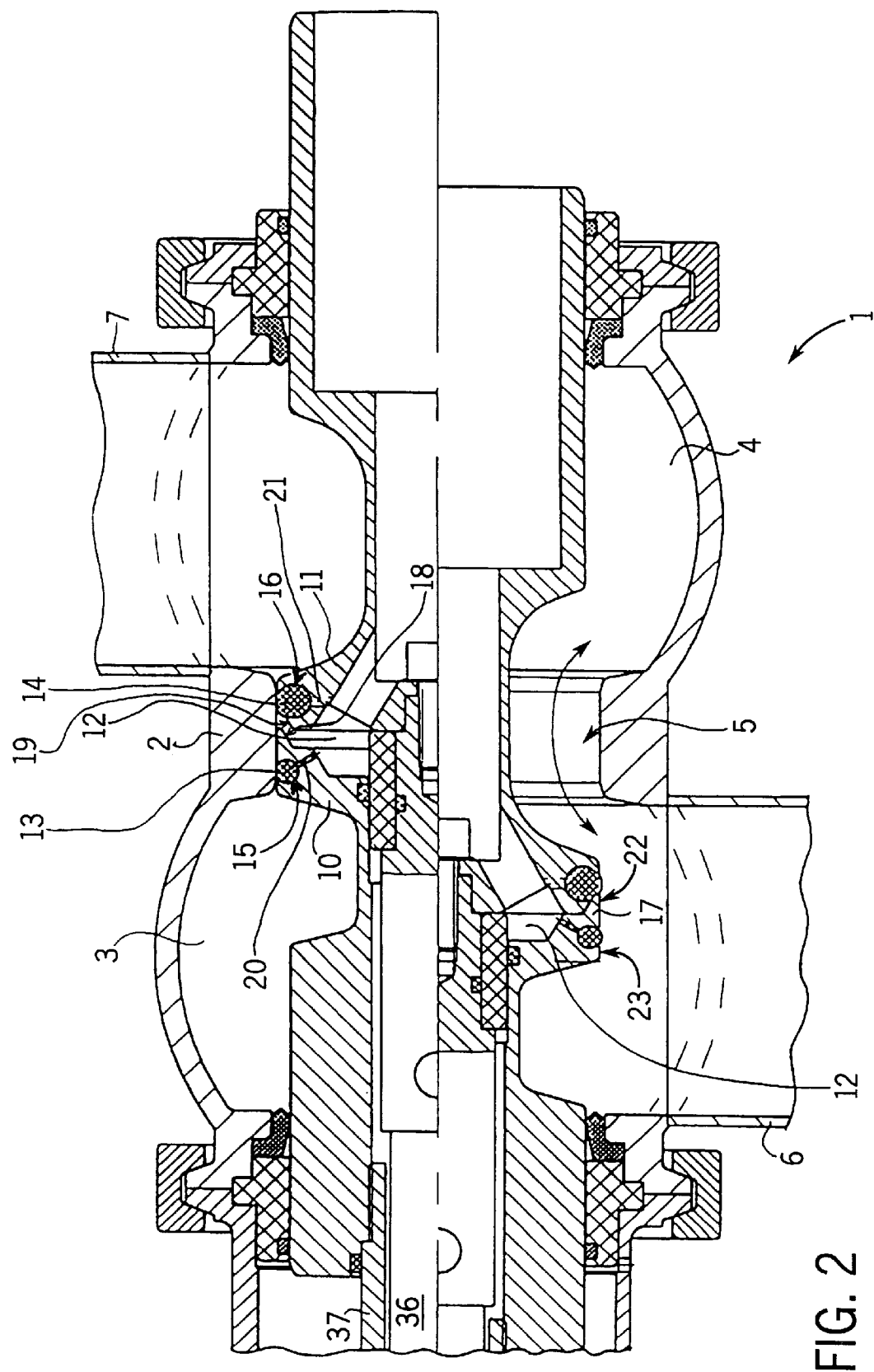

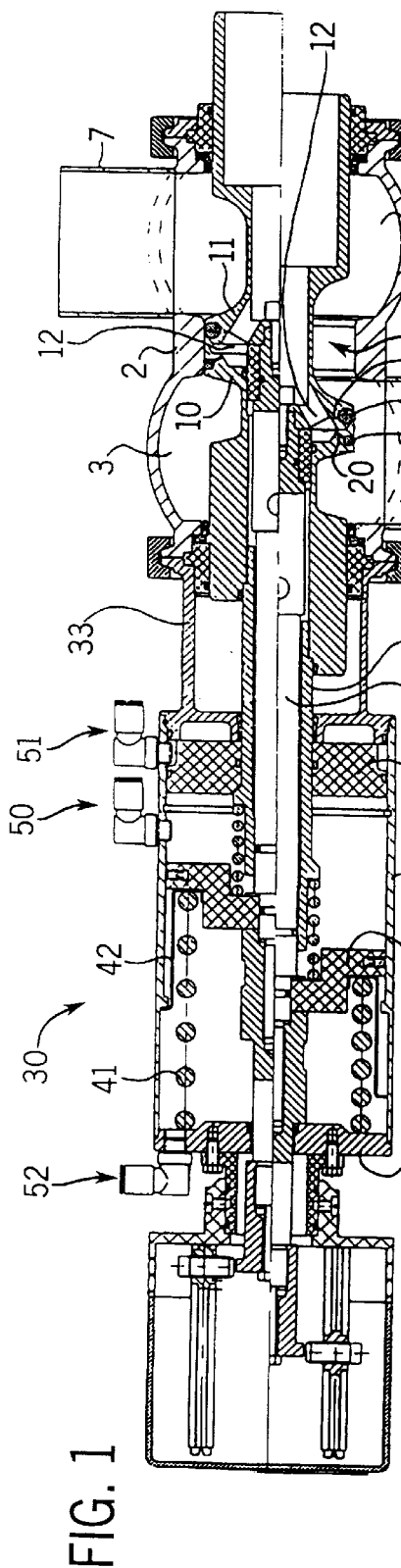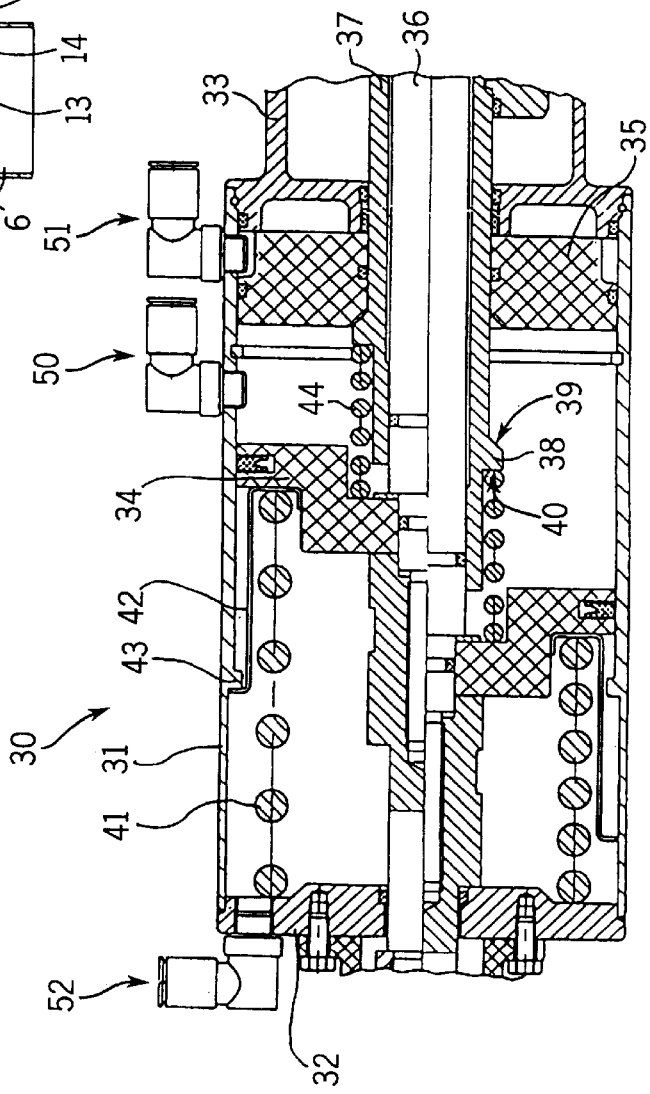
FIG. 1
FIG. 5

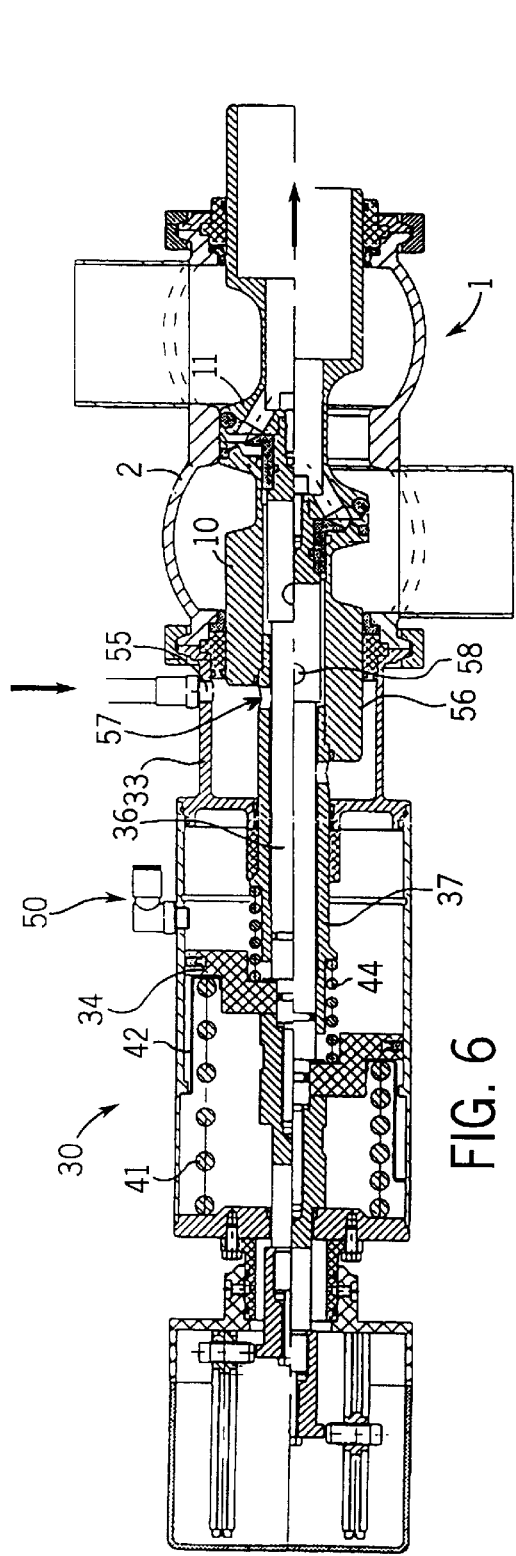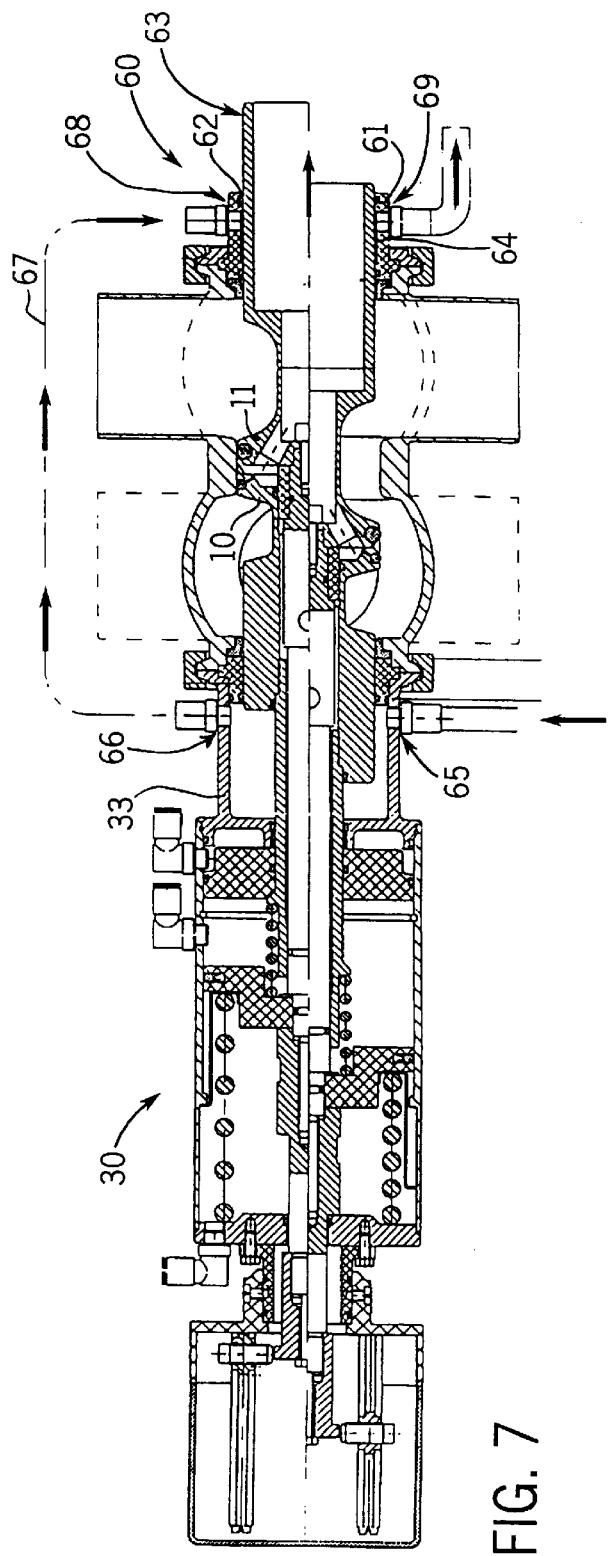

VALVE, PARTICULARLY DOUBLE-SEAT VALVE

The invention relates to a valve with a valve housing and at least one movable valve body cooperating with a valve seat or face, which has at least one sealing groove open to the valve seat or face, in which is placed or placeable a sealing body for sealing the valve body with respect to the valve seat or face.

In the case of valves of this type, they can in particular be single-seat or double-seat aseptic valves, such as are used for the control of flowable products in the chemical and foods sector. They can be constructed as ring main valves, bottom seat valves, angle valves or the like and generally have axially movable valve bodies.

Double-seat valves are more particularly used for the control of flowable products to be kept separated in the brewing, beverages, dairy, foods, pharmaceutical or chemical sectors, particularly in dairy installations for the control and simultaneous separation of milk and cleaning fluid. A double-seat valve has a valve housing, which has a first housing area e.g. connectable to a first pipe, e.g. a product pipe, and a second housing area e.g. connectable to a second pipe, e.g. a cleaning fluid pipe. For the random connection or sealed separation of the housing areas are provided an axially movable, first valve body cooperating with a valve seat and a second valve body cooperating with a valve seat and which is movable axially and relative thereto and in series therewith. The valve bodies define between them a leakage cavity open to the environment of the valve and each valve body has at least one sealing groove open to the associated valve seat, in which is placed or placeable a sealing body for sealing the valve body against the valve seat. The valve bodies are movable in such a way that in a closed position they prevent an overflow of fluid between the housing areas and in an open position permit an overflow, accompanied by a sealing of the leakage cavity. The leakage cavity is more particularly used for the leakage-proof separation of the products, because with sealing problems fluid passes from one or both of the housing areas into the leakage cavity, but not into the other housing area.

Particularly in the indicated use sectors, hygiene and cleanliness, as well as the possibility of a rapid, thorough cleaning of a valve is very important. Particular importance is attached to the fact that no contaminants can be deposited in the valves and/or contaminants can be easily removed. Thus, for cleaning purposes many of these valves can be rinsed through at regular intervals with a cleaning fluid in order to eliminate any contaminants which may have become deposited. Deposits which have not been removed, particularly with dairy products, cosmetics, etc., can aid the formation of germs, so that in unfavourable cases large product batches are contaminatable and therefore rendered unusable. It is generally desired to be able to easily replace and/or clean valves fixed within pipe networks.

Known double-seat valves, such as are disclosed by DE 38 35 944 or EP 711 940, are able to very adequately fulfil many of these requirements, but sometimes there is a tendency to contamination and germ formation.

The problem of the invention is to provide a valve obviating the disadvantages of the prior art. The valve is in particular to be constructed in such a way that the tendency to deposit difficultly removable contaminants is reduced or substantially suppressed.

To solve this problem the invention proposes a valve having the features of claim 1.

In the case of valves according to the preamble, the technical problem is inventively solved in that at least one sealing groove is connected through the associated valve body in fluid-conducting manner to the environment of the valve. In the case of double-seat valves the connection can particularly lead to the leakage cavity. Preferably such a connection is provided in all sealing grooves used for sealing against the valve seat. Thus, in addition to the groove opening facing the associated valve seat through which an inserted sealing body can project, a sealing groove has a connection leading out of the interior of the sealing groove to the environment. As a result, on inserting a sealing body, it is not possible for air inclusions to form, which can offer potential spaces for deposits. Thus, the air in the sealing groove displaced by the sealing material on fitting does not have to escape through the valve seat-facing groove opening reduced in size or closed normally by the sealing body to be inserted, but can instead be displaced by the inserted seal directly through the valve body and into the open. The at least one fluid pipe or line through the valve body also offers the possibility of cleaning the vicinity of the sealing groove and inserted sealing means by appropriate rinsing from the rear, i.e. through the at least one fluid line in the direction of the valve seat-facing groove opening. The rear opening of a sealing groove also permits a rapid leak indication if a seal tears. Whereas up to now in the case of a seal tear leaking fluid had to pass along the valve seat to the seal in order to be detactable, there is now an optionally shorter leakage flow path transversely to the circumferential direction of the seal through the sealing groove, which can aid in a much earlier leak indication, so that possibly greater contamination can be prevented by the replacement of seals in good time. The fluid-conducting connection between the sealing groove and the environment through the valve body can preferably be implemented by several, e.g. four fluid channels or bores with a radial fraction preferably regularly distributed round the sealing groove circumference. These fluid channels can e.g. issue into a hollow inner space of a valve body open to the environment and/or in the case of double-seat valves into the leakage cavity.

According to a further development, another measure for preventing the formation of deposits results from the fact that at least one and preferably all the sealing grooves have a through, convexly curved, particularly circular cross-section. In the latter can be inserted a cross-sectionally adapted, particularly cross-sectionally circular seal, normally in a slightly compressed state. As opposed to the known profiled, particularly dovetailed sealing grooves more particularly used with double-seat valves, an angle-free inner contour of the sealing groove offers no contaminant collecting points, because there is no possibility of a migration behind the sealing body and a deposition of contaminants of pockets in the vicinity of inner edges not filled by sealing material. A substantially circular sealing body cross-section also permits the smallest possible elastomer surface, which is also advantageous from the hygienic and cleaning standpoints.

A further development of a double-seat valve is characterized in that the seals of both the first valve body and the second valve body are constructed as radial seals. The latter preferably cooperate with a substantially cylindrical valve seat or face, which is formed between the housing spaces, particularly by the actual valve housing, but can also be provided on an insert separate from the valve housing. Unlike in the case of conventional solutions, no axially acting pressing force is necessary for sealing purposes. Therefore the drive for the axial movement of the valve body need only be sufficiently powerful to counteract axial forces caused by fluid pressure in the housing spaces. The drive does not have to apply an axial force or pretension for the sealing function. If such valves are pneumatically operated, they can be switched or actuated with much lower air pressures down to e.g. max 4 to 5 bar. Conventional valves, in which the sealing function is brought about by axial pressing of a valve body onto the associated valve seat, generally require between approximately 6 and approximately 8 bar. Therefore a drive according to this preferred development can be designed in a less expensive, lighter and smaller manner.

Whereas known double-seat valves in part have complicated seal arrangements with several, optionally differently cross-sectionally shaped seals, according to a first development the first valve body only has one seal, particularly a radial seal, and/or the second valve body only has one seal, particularly a radial seal. This reduces manufacturing costs, because in each case only one sealing groove has to be provided. The number of necessary parts and the number of potential contamination points can consequently be minimized.

With double-seat valves constructed according to the invention it is possible, as in the prior art, to provide for the sealing of the leakage cavity, in addition to the indicated housing seals, at least one further, separate seal provided on one or both valve bodies and which is provided in one valve body facing the other and which on telescoping the valve bodies is pressed onto the other valve body for sealing the leakage cavity. In a preferred embodiment there is no need for this. It is characterized in that one of the valve bodies, particularly the first valve body, forms a preferably inside conical sealing surface, which in the case of telescoped valve bodies cooperates with a housing seal of the other valve body, particularly the second valve body, for sealing the leakage cavity. As a result the housing seal cooperating with the housing-fixed valve seat can fulfil a double function, in that on the one hand it seals the valve body with respect to the housing valve seat and on the other seals the leakage cavity on the housing side when the valve bodies are telescoped.

A preferred embodiment of a double-seat valve is characterized by a centring function in the case of a joint shifting of the valve bodies in the first phase of the actuating process between the open position and the closed position. For this purpose centring means are provided for the mutual centring of the valve bodies during joint movement. In particular one of the valve bodies, preferably the first valve body can have a circumferential projection axially projecting in the direction of the other valve body, particularly the second valve body and preferably having an inside conical centring surface, which cooperates with a complimentary, particularly outside conical centring surface of the other valve body. On axially pressing the centring surfaces onto one another the valve bodies adhere to one another during the further advance and consequently ensure a radial stabilization during the actuating or switching process. Preferably said sealing surface is constructed on the circumferential projection for sealing the leakage cavity and the sealing groove of the other valve body opens towards the complimentary centring surface. Thus, also the cross-sectionally preferably nose-shaped circumferential projection has a double function both as a centring means and as a sealing seat during the sealing of the leakage cavity during switching.

A preferably pneumatic drive for the valve bodies of a double-seat valve can be designed in such a way that in an axial main stroke it moves the valve bodies from a closed position into an open position and in the closed position an overflow of fluid is prevented by the engagement of the seals on the valve seat between the housing spaces and in an open position an overflow is made possible, accompanied by the sealing of the leakage cavity. This fundamental function can, in special embodiments, be supplemented by further setting possibilities for the valve and preferably the first valve body and/or the second valve body are movable independently of one another into a cleaning position, in which the associated, at least one seal is connected in fluid-conducting manner to the leakage cavity disengaged from the valve seat and the associated housing space.

For producing the valve body movements during the main stroke, the drive can have a main piston, guided in a cylinder, which is preferably pneumatically operable and movable against the tension of at least one main spring and which is coupled to the drive-remote valve body, e.g. by means of a valve operating rod and preferably the drive-facing valve body is supported elastically, particularly by means of at least one secondary spring, on the main piston. Whereas the main spring can act as a piston return spring for the main piston, the secondary spring ensures a pressing onto one another of the valve bodies, accompanied by the sealing of the leakage cavity at the start of the stroke movement between the closed position and the open position.

According to a further development, the main spring, particularly constructed as a compression spring and preferably positioned within the cylinder is spring travel-limited, preferably by means of an in particular one-piece spring cage, which can be axially supported on the cylinder wall. This construction aids an easy, safe dismantling of the drive. The cylinder surrounding the main piston, the main spring and the spring cage, a cover closing the cylinder on the valve-remote side, as well as the main spring and the spring cage can form a unit, which does not have to be disassembled on dismantling. The main spring constructed as a compression spring is supported on one axial side on the cover and on the other axial side on the spring cage by means of which it acts on the main piston. If the spring cage assumes its end position e.g. defined by a cylinder-fixed stop and which corresponds to a maximum main spring deflection, the main spring is relieved or decoupled from the spring tension and during dismantling can be removed towards the cover-remote side of the cylinder, without there being any danger of hurled out drive parts when the cylinder is opened. The spring cage is thereby pressed by the springs on the stop, wobble-free and secured against dropping out within the cylinder.

According to a further development, at least one piston, preferably the main piston, can be supplied on both sides with fluid pressure, particularly compressed air. Whereas the described pressurization from the main spring-remote piston side initiates the opening movement, the introduction of pressure from the opposite side, where the main spring also acts, can bring about a movement of the main piston and the valve body connected thereto in a direction opposite to the opening movement. The piston can move out of the position in which it is in contact with the fully expanded spring held by the spring cage and is detached from the latter and the drive-remote, second valve body is moved into its cleaning position. As a result of the bilateral pressurization of the main piston in conjunction with the travel-limited piston return spring, it is consequently possible through a single piston, namely the main piston, to implement two different valve settings, namely the main stroke on the one hand and the lifting of the second valve body for cleaning purposes on the other. Such a valve requires fewer parts than conventional valves, which for each operating mode use a separate piston in the drive.

A further development, which permits a separate lifting of the first valve body into its cleaning position, is characterized in that the drive has a secondary piston guided in a cylinder and which is preferably pneumatically movable against the tension of a secondary spring and which can be coupled with the drive-facing valve body. Preferably in the lifting direction and preferably by means of a stop, the secondary piston acts on a preferably hollow valve rod connected to said valve body, whereas in the opposite direction it is movable relative to the valve rod. This makes it possible to set three separately controllable valve positions by two pistons in the drive.

Other further developments, in particular those permitting a cleaning or sterilization of movable parts of the valve bodies and/or valve body actuation outside the housing spaces and therefore an even more hygienic operation, will be explained in conjunction with the embodiments.

Further features and details of the invention can be gathered from the following description of preferred embodiments in conjunction with the drawings and claims. The individual features, either singly or in the form of combinations, can be implemented in an embodiment. Embodiments of the invention are described hereinafter relative to the attached drawings, wherein show:

FIG. 1 An axial longitudinal section through a standard construction of an inventively constructed double-seat valve in the closed position (top) and open position (bottom).

FIG. 2 A larger-scale detail of the valve housing with the housing spaces and valve bodies of the embodiment of FIG. 1 in the closed position (top) and open position (bottom).

Figure 3:
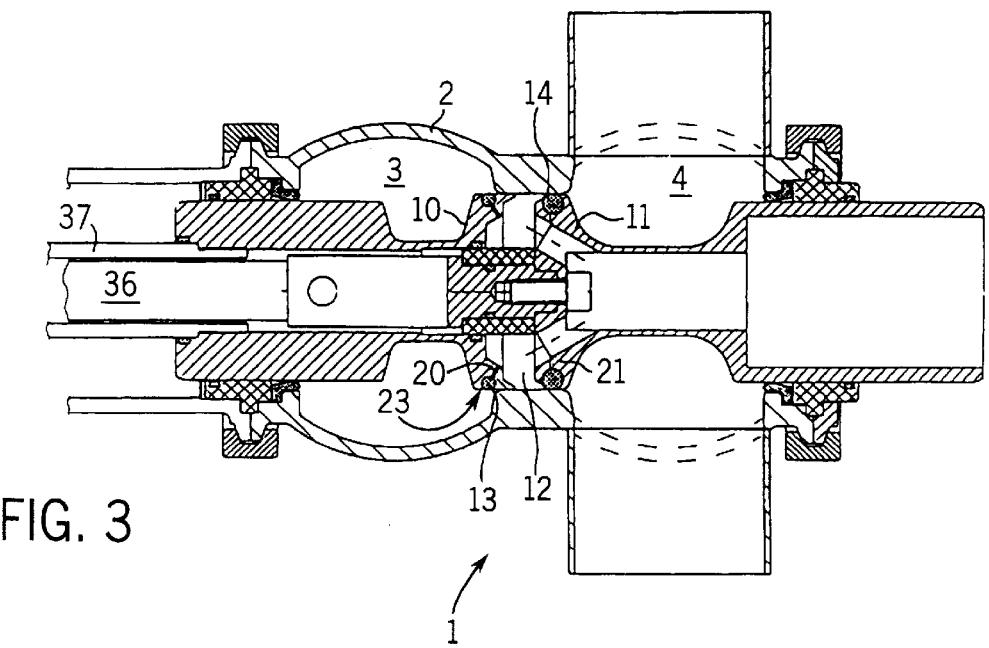

FIG. 3 A longitudinal section through the area of the valve housing during lifting and cleaning of the first valve body.

Figure 4:
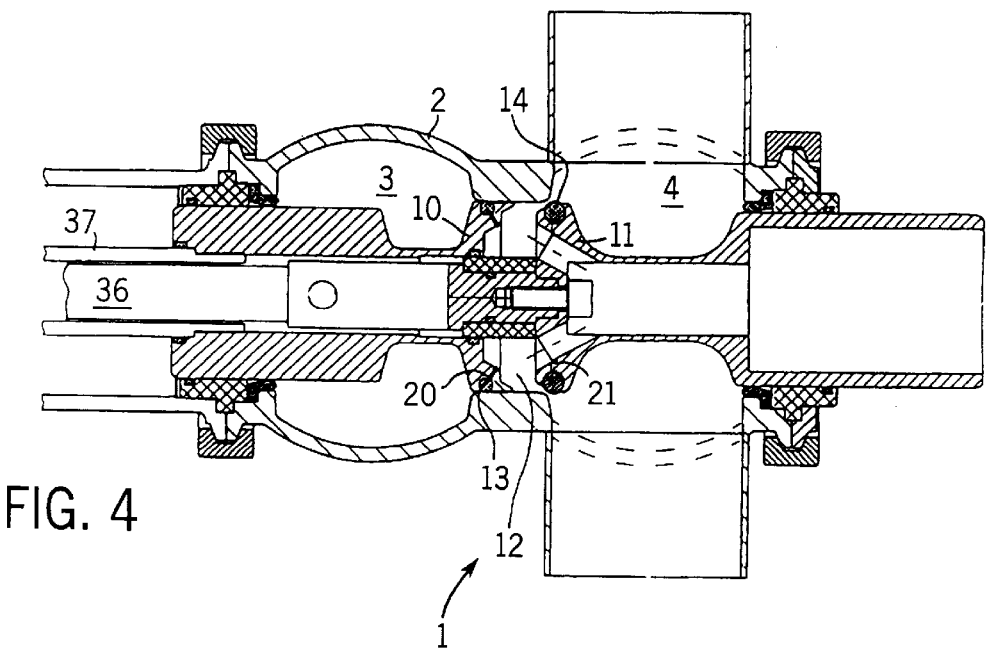

FIG. 4 A longitudinal section through the area of the valve housing during lifting and cleaning of the second valve body.

FIG. 5 A larger-scale detail of the drive of the embodiment of FIG. 1.

FIG. 6 A simple embodiment of a double-seat valve with a single pneumatic connection and integrated rinsing.

FIG. 7 Another embodiment of a double-seat valve similar to FIG. 1 with a device for cleaning and/or sterilizing the valve bodies outside the housing spaces.

The invention will be illustrated by the example of double-seat valves, but can also be used with single-seat valves. The longitudinal section of FIG. 1 shows a standard construction of an inventive double-seat valve 1, which can preferably be installed in vertically standing manner in crossing areas of lines or pipes of a line or pipe network with superimposed lines or pipes, e.g. in an automatic pressure tank system of a dairy. The valve, more particularly visible in FIG. 2, has a valve housing 2 with two axially displaced, flattened, spherical housing spaces or valve chambers 3, 4 between which is constructed on the housing wall a cylindrical valve seat or face 5 coaxially to the longitudinal axis of the valve. To the first housing space 3, which is at the top in the fitted state, can be connected by means of an associated connecting piece 6 a product pipe e.g. leading to a milk tank, whereas to the second, lower housing space 4 can be connected by means of a connecting piece 7 a pipe leading to a cleaning fluid tank. A housing space can optionally also be directly connected to a tank or some other container. In the valve housing are provided two valve bodies 10, 11 movable axially relative to the valve housing and to one another with valve disks in the vicinity of the valve seat 5 and which between them define a leakage cavity 12, which is open to the environment through the hollow interior of the second, lower valve body 11 and through which, in the case of sealing problems in the vicinity of the valve seat 5, leakage fluid can run into the open from the upper housing space 3 and/or the lower housing space 4, without fluid flowing from one to the other housing space when a valve is in the closed position.

For sealing against the valve seat 5, each of the valve bodies has in the circumferential area of the rotationally symmetrical valve disk a single, cross-sectionally circular sealing ring 13 or 14 made from chemically stable elastomer material, which is fitted into a sealing groove 15 or 16 cross-sectionally adapted to the associated sealing ring and accompanied by the complete filling of the sealing groove. The upper, first sealing groove 15 is cross-sectionally smaller than the lower, second sealing groove 16 and in the vicinity of a cylindrical circumferential surface 23 of the valve body 10 opens exclusively radially towards the valve seat 5. On the side of the upper valve body 10 facing the lower valve body 11 is constructed a cross-sectionally nose-shaped circumferential projection 17, which has an inner conical surface 18 widening conically towards the lower valve body and facing the leakage cavity 12. In the vicinity of the sealing groove 16, the lower valve body 11 has an outer conical surface 19 adapted to the slope or inclination of the inner conical surface 18 and over which projects the thicker sealing ring 14. In conjunction with the valve seat 5, the thicker sealing ring 14 forms a radial seal and is axially accessible from the side of the upper valve body 10.

Each of the sealing grooves 15 or 16 is connected in fluid-conducting manner by means of in each case four bores 20 or 21 uniformly distributed round the circumference of the associated valve body and towards the radial inside by the associated valve body to the leakage cavity 12 or the cavities of the valve body communicating therewith and the environment of the valve. These bores lead to many advantages, particularly decisive for hygienically sensitive use fields. In particular, on pressing the associated elastic sealing body through the outer opening of the sealing groove, which is narrower than the sealing ring diameter, the interior of the sealing groove is vented through the valve body, so that a sealing ring, which is normally slightly compressed in the inserted state and projects somewhat over the radial opening of the associated groove, can engage in full-surface manner on the inner face of the sealing groove, without there being any formation of cavities or pockets as a result of the "trapped" air. This avoids the formation of potential contaminant collecting points from the very installation stage. The possibility also arises of rinsing a sealing groove or seal, through the leakage cavity, from the rear or inside, which permits a cleaning of the contact area between seal and sealing groove without removing the sealing ring. Moreover, when a sealing ring has become brittle or torn, leakage fluid can pass over a short journey through the sealing groove and associated bore into the leakage space, so that sealing problems are noticed at an early stage. It was hitherto necessary for the leakage fluid to effect a detour via the sealed surface, i.e. the gap between the sealing ring and the valve seat 5.

The deposition of contaminants is additionally prevented by the angle-free, particularly circular cross-sectional shape of sealing groove and associated sealing ring. Whereas in conventional dovetailed and/or other partly planar surfaced-bounded sealing grooves there can be a formation of pockets not filled with sealing material and therefore a risk of a back-migration by contaminants, this risk is avoided by the full-surface engagement of the cross-sectionally circular sealing rings over the entire inner circumference of the associated, cross-sectionally circular sealing groove.

By means of a subsequently described drive, the valve bodies can be jointly axially moved in an axial main stroke from a closed position shown at the top in FIGS. 1 and 2 into an open position shown at the bottom therein.

In the closed position an overflow of fluid between the housing spaces 3, 4 is prevented in that the sealing rings 13 or 14 are sealingly pressed onto the cylindrical valve seat 5. If one of the seals leaks, in this closed position the particular fluid would not pass into the other housing space, but would instead flow past the associated seal and optionally pass to the outside through the associated bore 20 or 21 via the leakage space or cavity 12. Thus, by means of corresponding sensors sealing problems can be detected at an early stage and the corresponding valve can be replaced or repaired.

On moving into the open position shown at the bottom, which permits an overflow of fluid (arrow in FIG. 2) between the housing spaces, the second, lower or drive-remote valve body 11 is drawn towards the upper valve body 10. In the first opening process phase, the nose-shaped circumferential projection 17 engages with its inside conical surface 18 on the one hand under pressure on the outside conical surface 19 of the lower valve body and ensures a reciprocal centring of the valve bodies during the joint movement. On the other hand, as shown at the bottom in FIG. 2, the axial, sloping tip of the circumferential projection presses from the radially outside and axially on the free portion of the thick sealing ring 14 projecting over the outside conical surface 19, so that the connecting zone, which is scarcely liquid permeable as a result of the axial press fit, between the solid, particularly metallic parts of the valve bodies in the vicinity of the conical centring surfaces 18, 19 is sealed from the radial outside, i.e. on the intake side, against penetrating fluid. Thus, the sealing ring 14 fulfils a double function, in that on the one hand it forms a radial seal between the lower valve body 11 and valve seat 5 and on the other a combined radial/axial seal for the leakage cavity in the case of a joint movement of the valve bodies. There is consequently no need to provide a separate seal for sealing the leakage cavity. The inside conical surfaces 18 of the projections 17 also fulfil a double function, in that on the one hand they act as a mechanical centring surface and on the other as a valve seat for sealing the leakage cavity and with its tip the seal 14 is radially inwardly and axially compressed when the valve bodies engage on one another.

In preferred embodiments the first valve body and the second valve body can be moved independently of one another into a cleaning position, in which the associated seal 13 or 14 is disengaged from the valve seat 5 and the associated housing space 3 or 4 is connected in fluid-conducting manner to the leakage cavity 12. With the aid of FIG. 3 the lifting of the upper valve body 10 is explained, in which the latter is moved axially away from the securing, lower valve body 11, accompanied by an enlargement of the leakage cavity 12, to such an extent that the sealing ring 13 is disengaged from the valve seat 5 and is drawn into the interior of the housing space 3. The cylindrical circumferential surface 23 of the valve disk remains in engagement with the valve seat 5, which largely prevents a radial clearance, but permits a penetration of cleaning fluid under an overpressure from the housing space 3 into the environmentally open leakage cavity 12. A rinsing possibility for the lower valve acting in the same way will be illustrated by FIG. 4. The upper valve body remains in its situation occurring for the closed position with sealing engagement of the sealing ring 13 on the valve seat 5. The lower valve body 11 is moved axially so far from the upper valve body that, accompanied by an enlargement of the leakage cavity 12, the sealing ring 14 is drawn off the valve seat 5 and can now be rinsed by cleaning fluid, which can be supplied under pressure through the housing space 5. In both cases the in each case not rinsed or cleaned valve body seals its associated pipe in such a way that through it product fluid can still be passed during the rinsing process.

In the embodiments shown there is a further advantageous aspect in that all the seals are constructed as radial seals between the cylindrical valve seat 5 and the annular housing seals 13 or 14 of the valve bodies. Thus, a drive does not have to apply any axial pressing forces for the operation of the valves and in particular not for a secure sealing in the closed position, so that a drive does not aid any sealing function, but instead must merely act against the axial forces on the valve bodies brought about by the line or pipe pressure. Such valves can be switched or operated with limited force expenditure and particularly in the case of pneumatic actuation with lower air pressures than in the case of valves operating with axial seals.

Valves of the described type can be controlled by any suitable valve drive, which at least controls the open/closed position of the valve, but which can also permit the described individual adjustment of the two valve bodies 10 and 11. A preferred construction of a pneumatically operable drive 30 is explained relative to FIG. 5. The drive has a circular cylindrical tube 31, which is sealed on the valve-remote side by a welded-on cover or lid 32 having a central bore. On the opposite side is fitted a part of a lantern-like spacer 33 forming a sealed termination with central bore and which is removably fitted between the drive cylinder 31 and valve housing 2. In the embodiment shown in the cylinder are axially displaceably provided a main piston 34 sealed against the cylinder inner wall and, on its valve-facing side, a secondary piston 35 coaxial thereto. The main piston 34 is rigidly coupled to the lower valve body 11 by a cylindrical valve rod 36. The secondary piston 35 is used for the separate control of the upper valve body. The latter is fixed to a hollow valve rod 37 concentrically surrounding the valve rod 36 and which has within the drive cylinder a radially projecting collar 38, which forms on its side facing the secondary piston 35 a conical inclined face 39 and on the axially opposite side a radial stop face 40. The secondary piston 35 has a centring inside conical surface corresponding to the inclined face 39 and which during a movement of the secondary piston away from the valve housing drives the hollow valve rod 37, accompanied by engagement on the projection 38, whereas in the opposite direction the piston is sealingly displaceable on the valve rod 37.

Between the cover 32 and main piston 34 is provided in coaxial manner to the piston a main spring 41 constructed as a helical compression spring, which is on the one hand supported on the cover 32 and on the other on a spring cage 42. In the maximum deflection position of the spring 41 shown at the top in FIG. 5, the one-piece spring cage engages with a radially outwardly projecting projection behind an inner collar 43 of the cylinder 31 and consequently limits the spring travel of main spring 41. The spring cage is inserted in the cylinder 31 before welding down the cover 32 and is secured against dropping out of the cylinder by the inner collar 43. By means of the spring cage 42, the mainspring 41 acts on the main piston 34, which in the top position shown in FIG. 5 is decoupled from the tension of the main spring in the case of striking of the spring cage 42, whereas in the withdrawal position at the bottom the tension of the spring 41 acts via the spring cage on the main piston. When the main piston is raised from the spring cage, the latter is pressed by the spring onto the inner collar and secured in clearance-free manner. On the opposite side of the main piston is supported a secondary spring 44 surrounding the hollow rod 37 and whose other end acts on the radial stop face 40 and via the latter on the piston rod 37.

In the embodiment shown the drive 30 has three pneumatic connections 50 to 52 leading into the interior of the cylinder 31. The main stroke between the closed and open position is brought about by introducing pressurized gas via the main connection 50 between the main and secondary pistons, so that the main piston 34 is displaced counter to the tension of the main spring 41 and draws the lower valve body towards the drive. Accompanied by the closing of the leakage cavity, the valve body 11 moves towards the upper valve body 10 and drives it towards the drive, so that the collar 38 is raised from the secondary piston 35 acting as an axial stop. The secondary spring 44 brings about an axial pressing force of the valve bodies in the closed position and ensures a seating of the valve bodies on one another sealing the leakage cavity. The axial pressing force of the valve bodies in the closed position is therefore determined by the design of the secondary spring tension and is correspondingly adjustable. In the case of pressure relief the return spring 41 moves the main piston and the two piston rods 36, 37 jointly towards the housing 2 until the stop 38 strikes on the secondary piston and prevents a further axial movement of the upper valve body 10. The lower valve body then moves away from the upper valve body into the closed position with open leakage cavity. The secondary spring, which is weaker than the main spring, is then axially compressed.

For lifting the lower valve body (FIG. 4), through the pneumatic connection 52 located on the main spring side of the main piston, particularly in the cover 32, pressurized gas is introduced, which raises the main piston 34 from the spring cage 42 with spring 41 expanded to the maximum in stop-limited manner and moves it downwards in the direction of the valve housing, accompanied by the compression of the secondary spring 44, in order to reach the cleaning position shown in FIG. 4. On pressure relief the main piston, under the action of the secondary spring 44, returns to the closed position at the top in FIG. 5.

For the separate operation of the upper valve body 10 (FIG. 3) use is made of the valve-facing pneumatic connection 51, through which pressurized gas can be introduced on the side of the secondary piston 35 remote from the main piston and the springs. The introduced pressurized gas drives the secondary piston 35, accompanied by the valve rod 37 in the direction of the stationary main piston, so that the upper valve body is lifted. On pressure relief, the secondary piston under the tension of the secondary spring 44 returns to its lower stop position.

It is clear that in particular through the possibility of a bilateral pressurizing of the main piston 34 for three independently performable drive movements (main stroke, lifting the upper valve body and lifting the lower valve body) only two pistons are required which, whilst avoiding superfluous parts, permits a robust, inexpensive construction of a valve drive.

In addition, the drive can be dismantled with the simplest means and in a manner which is completely safe by a single operator. A central assembly of the drive comprises the cylinder tube 31, cover 32, main spring 41 and spring cage 42 and constitutes a self-contained unit, which is not normally disassembled. All the other parts in the drive, particularly the main piston with associated piston rod 36, secondary spring and secondary piston with associated piston rod 37 can be removed downwards without any difficulty and without any main spring loading. Thus, any seal in the compressed air area is readily accessible for inspection or replacement.

In the following constructions components having the same or a similar function to those of FIGS. 1 to 5 are given the same reference numerals. The embodiment according to FIG. 6 is shown with the simplest possible drive having a single main pneumatic connection 50 and with no secondary piston. It can therefore only perform the described main stroke, but not the separate cleaning strokes. A special feature is the possibility which exists after suitable modification in the other embodiments of a separate cleaning of movable parts of the valve actuating system. An intermediate area between drive 30 and valve housing 2 is sealed in contamination-tight manner by the lantern 33, but is in particular hermetically sealed in moisture-tight manner, so that no dirt can penetrate. Through a radial connection opening 55 of the lantern 33 cleaning fluid can be passed into the interior of the spacer 33, so that in said portion the outside of the valve rod 37 and, with valves in the open position, a cylindrical portion 56 of the upper valve body can be cleaned and during the axial stroke movements it is moved backwards and forwards between the interior of the valve housing 2 and the valve housing environment. This prevents the introduction of dirt into this area. The hollow valve rod 37 has a group of radial through bores 57 located within the lantern throughout the stroke movement and through which cleaning fluid can be passed into the interior of the hollow rod 37, so as to rinse its inside and the outside of the inner valve rod 36 sealed on the drive side against the inside. The inner valve rod 36 is hollow at least in the valve body-facing portion and through bores 58 pass into the hollow interior issuing into the open in the vicinity of the lower valve body 11. Thus, cleaning fluid can be introduced into the intermediate area 33 and can be drained to the open again through the communicating cavities and accompanied by the cleaning of the surfaces bounding the cavities.

On the drive side the embodiment according to FIG. 7 is constructed like that of FIGS. 1 and 5 and consequently permits both a main stroke and also the separate lifting and cleaning of the valve bodies. In addition to the lantern-shaped spacer 33, in this embodiment a drive-remote end region 60 is sealed in fluid-tight manner. This is brought about by a cylindrical end piece 61 projecting over the lower end of the valve housing and in whose outer area a radial seal 62 seals against a cylindrical outer face 63 on the lower valve body and consequently creates a flat, annular clearance-like gap 64 between end piece 61 and valve body 11. The spacer has an inlet opening 65 and a radially facing outlet opening 66 leading by means of a bypass line 67, indicated by arrows and running outside the valve housing to an inlet opening 68 in the annular clearance 64, from which cleaning fluid can drain through a radially facing outlet opening 69.

There is also the possibility of inside cleaning of the valve rods explained relative to FIG. 6. The embodiment permits an optionally permanent rinsing or cleaning and optionally sterilization of all surfaces passing into the interior of the housing spaces 3, 4 during valve body movements, which reliably prevents any introduction of contaminants.

It is obvious to the expert that the advantages of inventive valves explained in conjunction with the seals can be achieved with any type of suitable drive, whilst conversely the described, advantageous drives are usable with any double-seat valve designed for the described actuations. The described cleaning possibilities also exist independently of the seals and the drive in the case of other double-seat valves. In particular, the design in the sealing area with fluid channels, which connect the interior of sealing grooves with the environment of a valve, are also advantageously usable in the case of valves with a single valve body or more than two valve bodies. Thus, the invention also permits a valve, particularly for controlling flowable products in the chemical and foods sector, with a valve housing and at least one preferably axially movable valve body cooperating with a valve seat and which has at least one sealing groove open to the valve seat, in which is placed or placeable a seal or a sealing body for sealing the valve body against the valve seat, in which at least one sealing groove is connected through the valve body in fluid-conducting manner to the valve environment. The valve body can e.g. have a hollow interior open to the environment into which issue the connecting channels to the sealing groove.

What is claimed is:

1. A valve for controlling the flow of fluid products, the valve comprising:

a valve housing;

at least one movable valve body cooperating with a valve seat associated with the valve housing;

the valve body comprising at least one sealing groove open towards the valve seat for receiving a corresponding sealing body adapted for sealing the valve body against the valve seat;

the sealing groove having a cross-section which is at least one of convexly curved and circular along the entire circumference of the sealing groove; and the sealing body being placeable in the sealing groove having a cross-section which is at least one of convexly curved and substantially circular along the entire circumference of the sealing groove and being adapted to the cross-section of the associated sealing groove such that in a contact area between the sealing body and the sealing groove receiving the sealing body no voids are formed; and wherein the sealing groove is connected in fluid-conducting manner to the environment of the valve by at least one fluid leakage channel leading from the sealing groove through the valve body to the environment when fluid leaks from said sealing groove for receiving said corresponding sealing body.

2. The valve according to claim 1, wherein the valve body comprises a plurality of fluid leakage channels distributed around the circumference of the sealing groove and leading from the sealing groove through the valve body to the environment.

3. The valve according to claim 1, wherein all sealing grooves have a cross-section which is at least one of convexly curved and circular along the entire circumference of the sealing groove.

4. The valve according to claim 1, wherein all sealing bodies placeable in the sealing grooves have a cross-section which is at least one of convexly curved and substantially circular and which is adapted to the cross-section of the associated sealing groove such that in a contact area between a sealing body and a sealing groove receiving the sealing body no voids are formed.

5. A valve according to claim 1, wherein the valve is constructed as a double-seat valve for controlling the flow of flowable products which are to be kept separate, the double-seat valve comprising:

a valve housing forming a first housing space and a second housing space;

a valve seat positioned between the first and second housing space;

an axially movable first valve body and a second valve body disposed in series with the first valve body and movable axially and relative to the first valve body;

the first and second valve bodies defining between them a leakage cavity open to the environment of the valve;

wherein each valve body comprises at least one sealing groove open towards the valve seat for receiving a sealing body for sealing the respective valve body against the valve seat;

the sealing groove having a cross-section which is at least one of convexly curved and circular along the entire circumference of the sealing groove; and the sealing body being placeable in the sealing groove having a cross-section which is at least one of convexly curved and substantially circular along the entire circumference of the sealing groove and being adapted to the cross-section of the associated sealing groove such that in a contact area between the sealing body and the sealing groove receiving the sealing body no voids are formed; and wherein the sealing groove is connected in fluid-conducting manner to the environment of the valve by said at least one fluid leakage channel leading from the sealing groove to the environment.

6. The valve according to claim 5, wherein the at least one fluid leakage channel is leading from the sealing groove into the leakage cavity.

7. The valve according to claim 5, wherein there are formed seals between the first valve body and the valve seat and between the second valve body and the valve seat and wherein the seals are constructed as radial seals.

8. The valve according to claim 5, wherein the valve seat is cylindrical.

9. The valve according to claim 5, wherein at least one of the first valve body and the second valve body comprises only one sealing groove.

10. The valve according to claim 5, wherein one of the valve bodies forms a conical sealing face axially accessible from the side of the other valve body and wherein the other valve body comprises a sealing body and wherein the sealing body cooperates with the conical sealing face for sealing the leakage cavity when the valve bodies are moved towards each other.

11. The valve according to claim 5, further comprising centering means for the mutual centering of the valve bodies in case of a joint movement.

12. The valve according to claim 5, wherein one of the valve bodies has a circumferential projection projecting axially in the direction of the other valve body, the projection forming a centering face for cooperation with a complimentary centering face of the other valve body for a mutual centering of the valve bodies in the case of a joint movement.

13. The valve according to claim 12, wherein the centering face of the projection is inside conical and the centering face of the other valve body is outside conical.

14. The valve according to claim 10, wherein the conical sealing face is constructed for sealing the leakage cavity along a circumferential projection of the valve body forming the sealing face and wherein the sealing face is formed by the centering face of the circumferential projection.

15. The valve according to claim 5, further comprising a drive acting on the valve bodies for moving the valve bodies, the drive being constructed in such a way that in an axial main stroke the valve bodies are movable from a closed position into an open position, wherein in the closed position an overflow of the fluid products between the housing spaces is prevented and in an open position the leakage cavity is sealed and an overflow is permitted between the housing spaces.

16. The valve according to claim 15, wherein the drive is designed in such a way that at least one of the first valve body and the second valve body can be moved independently from the other valve body into a cleaning position in which the sealing body associated with the moved valve body is disengaged from the valve seat in such a way that the associated housing space is connected in fluid-conducting manner to the leakage cavity.

17. The valve according to claim 15, wherein the drive comprises a movable main piston guided in a cylinder and movable counter to the tension of at least one main spring, the main piston being coupled to the valve body remote from the drive and wherein the valve body facing the drive is elastically supported on the main piston by means of at least one secondary spring.

18. The valve according to claim 17, wherein the main spring is constructed such that the main spring is travel-limited by means of a spring cage, which is axially supportable on a wall of the cylinder.

19. The valve according to claim 15, wherein the drive comprises means for supplying fluid pressure to at least one piston in such a way that the at least one piston can be subject to fluid pressure on both sides for piston movement in both axial directions.

20. The valve according to claim 19, wherein the drive is constructed such that the main piston can be supplied with fluid pressure on both sides.

21. The valve according to claim 15, wherein the drive comprises a secondary piston guided in the cylinder and movable against the tension of at least one spring and wherein the secondary piston can be coupled to the valve body facing the drive in such a way that the secondary piston, when moved in one axial direction, drives the valve body and, when moved in the opposite axial direction, is movable relative to the valve body.

22. The valve according to claim 15, wherein the drive comprises an assembly which incorporates a cylinder which is closed on the side remote from the valve bodies by a cover and in which is provided a spring cage surrounding a main spring so as to prevent the main spring from dropping out of the cylinder.

23. The valve according to claim 22, wherein the spring cage is manufactured in one piece.

24. The valve according to claim 22, wherein the main spring is supported with one end on the cover and with the other end on the spring cage such that the main spring is axially prestressed.

25. The valve according to claim 1, wherein a drive is provided outside the valve housing and wherein an intermediate area is defined between the drive and the valve housing, the intermediate area being sealed in contamination-tight manner.

26. The valve according to claim 25, wherein the intermediate area is surrounded by a wall and wherein there is provided at least one inlet opening in the wall for connecting the intermediate area with a fluid pipe and at least one outlet opening for letting the fluid out of the intermediate area.

27. The valve according to claim 25, comprising a replaceable tubular spacer between the drive and the valve housing for surrounding movable parts of at least one of valve body actuating means and valve bodies in a contamination-tight manner.

28. The valve according to claim 1, wherein a drive is provided outside the valve housing and wherein an end region is defined on a side of the valve housing remote from the drive, the end region surrounding parts of a valve body movable into and out of the valve housing, the end region being closed in fluid-tight manner and being sealed against the valve body.

29. The valve according to claim 28, wherein the end region is surrounded by a wall and wherein there is provided at least one inlet opening in the wall for connecting the end region with a fluid pipe and at least one outlet opening for letting the fluid out of the end region.

30. The valve according to claim 1, wherein there is provided a drive outside the valve housing and an intermediate area is defined between the drive and the valve housing and wherein an end region is defined on the drive-remote side of the valve housing wherein the intermediate area and the end region are sealed in contamination-free manner and wherein the intermediate area is connected in fluid-conducting manner to the end region outside of the valve housing by at least one bypass pipe connecting the intermediate area and the end region.

* * * * *